US 7,606,948 B2

(12) United States Patent
Campello et al.

(10) Patent No.: US 7,606,948 B2
(45) Date of Patent: Oct. 20, 2009

(54) SYSTEM AND METHOD FOR GENERATING WARRANTY AND PRICING INFORMATION FOR DATA STORAGE APPARATUS

(75) Inventors: Jorge Campello, Cupertino, CA (US); Bruce A. Wilson, San Jose, CA (US); Richard New, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 544 days.

(21) Appl. No.: 11/004,527

(22) Filed: Dec. 2, 2004

(65) Prior Publication Data
US 2006/0122854 A1 Jun. 8, 2006

(51) Int. Cl.
*G06F 3/00* (2006.01)
(52) U.S. Cl. .............................. 710/15; 705/22; 705/28
(58) Field of Classification Search .................... 710/15, 710/18, 19
See application file for complete search history.

(56) References Cited

U.S. PATENT DOCUMENTS

| | | | |
|---|---|---|---|
| 6,467,054 B1 | 10/2002 | Lenny | |
| 6,584,290 B2 * | 6/2003 | Kurz et al. | ............... 399/12 |
| 6,594,597 B1 | 7/2003 | Schoch | |
| 2003/0074230 A1 | 4/2003 | Merkin et al. | |
| 2005/0011948 A1 * | 1/2005 | Pate | ............... 235/385 |

OTHER PUBLICATIONS

Ottem et al., "Playing it S.M.A.R.T.", Jun. 1995, http://web.archive.org/web/20000303111710/http://www.seagate.com/support/kb/disc/smart.html.*
Robert Heege, "Not So Smart Technology", Serverwortd Magazine. Jun. 2002 Issue.

* cited by examiner

*Primary Examiner*—Henry W. H. Tsai
*Assistant Examiner*—Elias Mamo
(74) *Attorney, Agent, or Firm*—Townsend and Townsend and Crew LLP; Patrick Duncan (57) ABSTRACT

Embodiments of the present invention provide a system and a method for generating warranty and pricing information for one or more data storage apparatuses. In one embodiment, a system for processing status parameters of one or more data storage apparatuses comprises at least one host system configured to retrieve one or more status parameters of one or more data storage apparatus; a vendor system; and a network coupled with the at least one host system and the vendor system. The at least one host system is configured to send the one or more status parameters via the network to the vendor system. The vendor system is configured to use the one or more status parameters to generate any one or more of warranty information, pricing information, and design improvement information for the data storage apparatus.

21 Claims, 4 Drawing Sheets

SYSTEM AND METHOD FOR GENERATING WARRANTY AND PRICING INFORMATION FOR DATA STORAGE APPARATUS

CROSS-REFERENCES TO RELATED APPLICATIONS

This application is related to concurrently filed, commonly assigned, U.S. patent application Ser. No. 11/003,720, entitled "Apparatus and Method for Monitoring Data Storage Device for Usage and Warranty," the entire disclosure of which is incorporated herein by reference.

BACKGROUND OF THE INVENTION

This invention relates generally to storage systems and, more particularly, to an apparatus and a method of monitoring a hard disk drive for usage, warranty, and pricing.

Current warranty rules only take into account the purchase data and/or manufacturing data when determining if a given hard disk drive (HDD) should be repaired or replaced under the warranty agreement. Warranties are normally given in years from the date of sale. This warranty scheme is inadequate.

In the past, when the interface of the drive typically determined the type of use for the HDD, the level of resolution used was somewhat inadequate. Today, there is a blurring between a desktop model HDD and an enterprise HDD. A desktop model HDD has a lower price than an enterprise HDD and has a 3-5 year warranty based on the fact that a typical PC user does not stress the HDD very much. It is important to be able to clearly distinguish between the two with respect to usage and warranties. In particular, as more desktop class HDDs with Serial ATA (SATA) interface are used in enterprise applications such as storage arrays, there will be a larger amount of HDDs that malfunction within the warranty period as a result of the higher utilization and harsher environment of typical storage arrays. This extra cost will be passed onto the HDD manufacturers. It is difficult to determine the manner in which current HDDs have been used without incurring heavy costs and performing time-consuming testing.

Because some computers with desktop model HDDs are used for enterprise solutions, it is important to offer PC users longer year warranties and to avoid extending the same warranty into high utilization applications. In addition, it is desirable to extend a fair warranty into high utilization applications. Therefore, there is a need to base warranty on predicable and known factors. Because the warranty is no longer year-based, it is essential to be able to determine the status of the warranty.

It is usually hard to determine how and when an HDD was used, especially when it is no longer working. For warranty purposes, it is desirable to determine if the HDD was used outside of the original system while it was powered down, and whether the HDD was used within the terms of the warranty. The HDD usage information is also desirable for failure analysis and to determine design vulnerabilities or the like.

One current technique for monitoring HDD usage is Self-Monitoring and Reporting Technology (SMART). SMART monitors events that are likely to result in HDD failure, and provides an early warning of drive failure based on detected performance degradation. SMART acts as an interface between a computer's start-up program or BIOS (Basic Input/Output System) and the HDD. Three elements are required for SMART to succeed: a SMART capable hard drive, an operating system that accepts and relays SMART commands, and a SMART application that displays these commands to the user. Because there is no standard associated with SMART, the SMART application is often omitted or inactive and hence failure alerts from the HDD tend to be ignored.

BRIEF SUMMARY OF THE INVENTION

Embodiments of the present invention provide a method and a system for providing warranty factor tracking with indicator in a HDD. The HDD can keep track of statistics tied to a warranty policy, and the information is available to the warranty service department. In specific embodiments, the HDD may include any or all of a mechanism to monitor warranty factor statistics, a counter or register that keeps track of warranty factor statistics, and a warranty status indicator. For example, the HDD has a set of counters and/or logs that are preferably tamper resistant and are always on (i.e., not optional). These counters and/or logs are configured to register the pattern of usage of the HDD, and can be used to set warranty rules in much the same way that an odometer is used to set warranty rules for the automotive industry. Once the usage has exceeded the warranty threshold, the system will send a flag that can be easily read even if the HDD is no longer working.

In accordance with an aspect of the present invention, a data storage apparatus comprises a nonvolatile storage; and a data storage controller configured to store a log of status parameters of the data storage apparatus in the nonvolatile storage. The log of status parameters of the data storage apparatus in the nonvolatile storage is not resettable. Storing of the log of status parameters of the data storage apparatus in the nonvolatile storage cannot be disabled.

In some embodiments, the nonvolatile storage may comprise an area on a surface of a disk of a disk drive. The nonvolatile storage may comprise a tamper resistant module. The nonvolatile storage is configured to be readable without powering up the data storage apparatus. The data storage controller is configured to update the log of status parameters of the data storage apparatus in the nonvolatile storage during any one or more of (i) powering up of the data storage apparatus, (ii) shutting down of the data storage apparatus, and (iii) operating time of the data storage apparatus in a periodic manner. The data storage controller is configured to check the log of status parameters of the data storage apparatus before shutting down of the data storage apparatus and after subsequent starting up of the data storage apparatus to verify if the data storage apparatus has been used with a different system during a period of shut down between the shutting down and the subsequent starting up of the data storage apparatus.

In specific embodiments, the status parameters include an encrypted usage parameter which keeps track of one or more systems with which the data storage apparatus is used. A warranty status indicator indicates whether warranty of the data storage apparatus has been terminated, and is configured to provide an irreversible indication when the warranty of the data storage apparatus is terminated.

In accordance with another aspect of the invention, a data storage apparatus comprises a detection module to detect whether warranty of the data storage apparatus has been terminated; and a warranty status indicator operatively coupled with the detection module to indicate whether the warranty of the data storage apparatus has been terminated. The warranty status indicator is configured to provide an irreversible indication when the warranty of the data storage apparatus is terminated.

In some embodiments, the warranty status indicator comprises a fuse that is burned when the warranty of the data storage apparatus has been terminated. The warranty status indicator indicates that the warranty of the data storage apparatus has been terminated when information detected by the detection module shows one or more warranty thresholds have been exceeded. The information detected by the detection module may include non-operating parameters detected when the data storage apparatus is shut down. The information detected by the detection module may include operating parameters detected when the data storage apparatus is operating. The detection module comprises a nonvolatile storage and a data storage controller configured to store a log of status parameters of the data storage apparatus in the nonvolatile storage. The log of status parameters of the data storage apparatus in the nonvolatile storage is not resettable. Storing of the log of status parameters of the data storage apparatus in the nonvolatile storage cannot be disabled. The warranty status indicator indicates that the warranty of the data storage apparatus has been terminated when the log of status parameters of the data storage apparatus in the nonvolatile storage shows one or more warranty thresholds have been exceeded.

In accordance with another aspect of the invention, a method of validating warranty of a data storage apparatus comprises storing a log of status parameters of the data storage apparatus in a nonvolatile storage, the log of status parameters of the data storage apparatus in the nonvolatile storage being not resettable and storing of the log of status parameters of the data storage apparatus in the nonvolatile storage configured not to be disabled; and checking the status parameters in the log against one or more warranty thresholds to determine whether warranty of the data storage apparatus has been terminated.

In some embodiments, the method further comprises detecting information outside of the log of status parameters in the nonvolatile storage, and setting the warranty status indicator to indicate that the warranty of the data storage apparatus has been terminated when the detected information shows one or more warranty thresholds have been exceeded. The information detected outside of the log of status parameters in the nonvolatile storage includes non-operating parameters detected when the data storage apparatus is shut down.

In accordance with another aspect of the present invention, a method of processing status parameters of one or more data storage apparatuses comprises receiving, via a network by a vendor system, one or more status parameters of a data storage apparatus retrieved by a host system from the data storage apparatus; and using the one or more status parameters to generate any one or more of warranty information, pricing information, and design improvement information for the data storage apparatus.

In some embodiments, the one or more status parameters are stored in a nonvolatile storage in the data storage apparatus. The one or more status parameters may be retrieved automatically by the host system on a periodic basis, and may be sent automatically by the host system to the vendor system on a periodic basis. The method may further comprise sending a request by the vendor system to the host system for retrieval of the one or more status parameters prior to retrieving and sending the one or more status parameters to the vendor system by the host system. The request from the vendor system includes computer-readable instructions on retrieving and sending the one or more status parameters.

In specific embodiments, the warranty information generated includes any one or more of warranty length, warranty termination, and warranty factor statistics for the data storage apparatus. The pricing information generated includes any one or more of pricing of the data storage apparatus, warranty pricing of the data storage apparatus, and lease pricing of the data storage apparatus. The design improvement information generated includes any one or more of a main factor affecting longevity of the data storage apparatus, and product specification that can be relaxed as having little or no influence on the longevity of the data storage apparatus. Receiving may comprise receiving one or more status parameters of a random sample of multiple data storage apparatuses by the vendor system. The method may further comprise sending by the vendor system to the host system via the network an alert regarding warranty violation if the one or more status parameters fall outside an acceptable range. The method may further comprise sending by the vendor system to the host system via the network a notification regarding remaining warranty length of the data storage apparatus based on the one or more status parameters.

In accordance with another aspect of the invention, a system for processing status parameters of one or more data storage apparatuses comprises at least one host system configured to retrieve one or more status parameters of one or more data storage apparatus; a vendor system; and a network coupled with the at least one host system and the vendor system. The at least one host system is configured to send the one or more status parameters via the network to the vendor system. The vendor system is configured to use the one or more status parameters to generate any one or more of warranty information, pricing information, and design improvement information for the data storage apparatus.

Another aspect of the present inventions is directed to a computer program product stored on a computer-readable storage medium for processing status parameters of one or more data storage apparatuses. The computer program product comprises code for receiving, via a network by a vendor system, one or more status parameters of a data storage apparatus retrieved by a host system from the data storage apparatus; and code for using the one or more status parameters to generate any one or more of warranty information, pricing information, and design improvement information for the data storage apparatus.

DETAILED DESCRIPTION OF THE INVENTION

Embodiments of the present invention provide a technique to provide warranty factor tracking with indicator in a HDD. The HDD can keep track of statistics tied to a warranty policy, and the information is available to the warranty service department. To do so, the HDD may include a set of counters and/or logs that are preferably tamper resistant and are always on (i.e., not optional). These counters and/or logs are configured to register the pattern of usage of the HDD, and can be used to set warranty rules.

Figure 1:
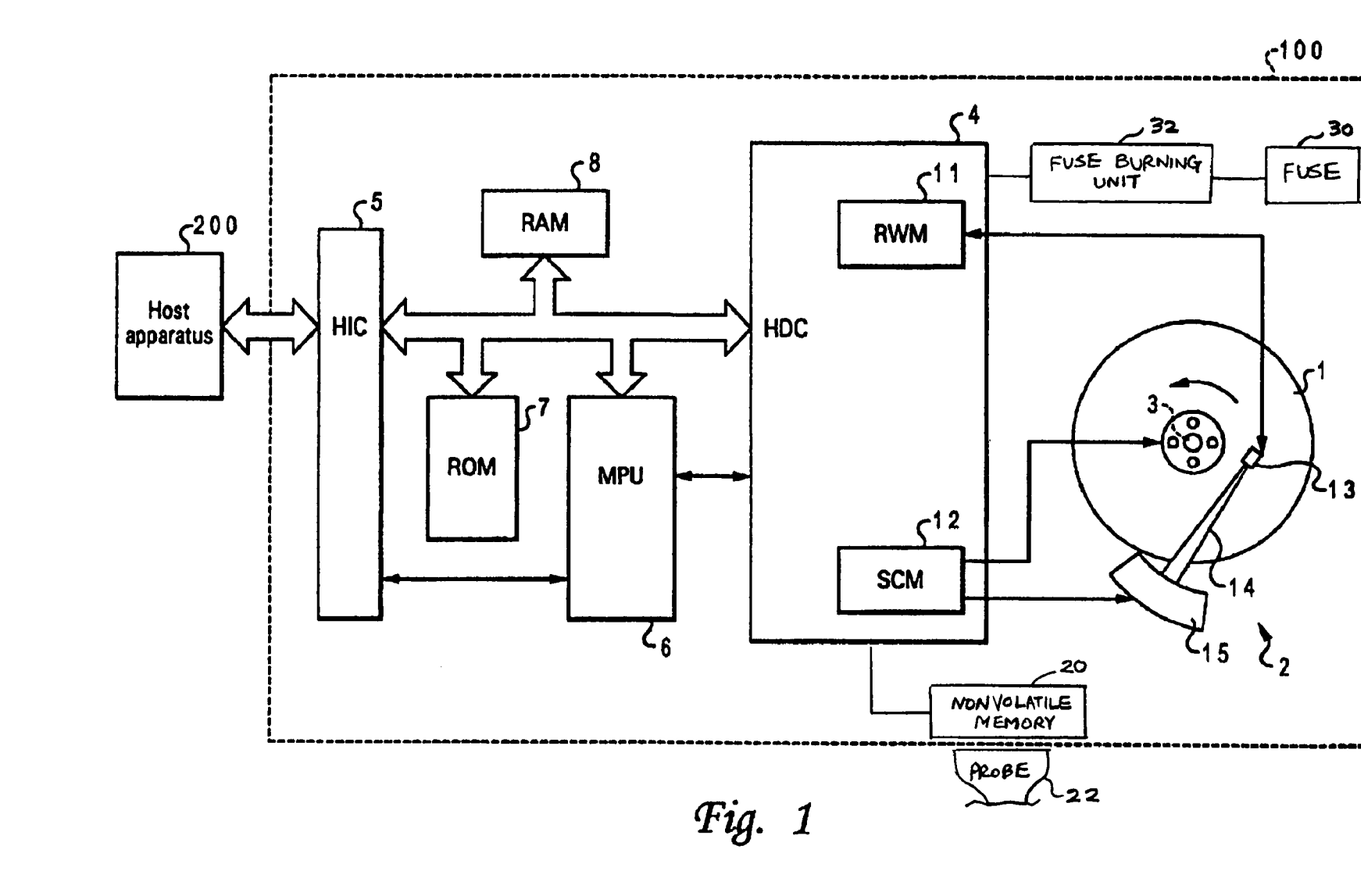
FIG. 1 is a schematic diagram of a system including a host and a hard disk drive apparatus according to an embodiment of the present invention.

FIG. 1 is a block diagram showing an illustrative embodiment of a data storage apparatus such as a disk apparatus 100. The disk apparatus 100 is a hard disk drive (HDD), and includes a disk 1 that is a data recording medium, an access mechanism 2 that rotates over and accesses the disk 1, a spindle motor 3 rotating the disk 1, a hard disk controller (HDC) 4, a host interface controller (HIC) 5 for communicating with a host apparatus 200, a micro processing unit (MPU) 6, ROM 7, and RAM 8. The HDC 4, HIC 5, MPU 6, ROM 7 and RAM 8 are connected with each other via a data bus. A surface of the disk 1 is partitioned into plenty of tracks that are concentric circles. Each track is partitioned into plenty of sectors (data sectors). These sectors are located in the longitudinal direction (circumferential direction) of the track. In each sector, 512 bytes of data (user data) may be recorded, for example.

The access mechanism 2 has a read/write head 13, an arm 14 that has the read/write head 13 at the end thereof, and a voice coil motor (VCM) 15 that rotates the arm 14. This access mechanism 2 accesses the sector and writes data into the sector accessed or reads data from the sector accessed. The HDC 4 has a read/write module (RWM) 11, and a servo control module (SCM) 12. This HDC 4 is hardware that drives the access mechanism 2 and performs the processing relating to an access (read/write of data) to the disk 1. The RWM 11 converts write data into an analog signal at the time of data write and sends the generated write signal to the access mechanism 2. In addition, RWM 11 converts a read signal that is read from the disk 1, by the access mechanism 2 into a digital signal at the time of data read and transfers the generated read data to the RAM 8. The SCM 12 not only drives the spindle motor 3 so that the rotational speed of the disk 1 may follow a target value, but also drives the access mechanism 2 so that the access mechanism 2 may follow a target track on the disk 1.

The HIC 5 is connected to the host apparatus 200 via a two-way communications channel. This HIC 5 is hardware performing the processing relating to data transfer (reception of a read command, a write command, a read address, a write address, and write data, and transmission of read data from the disk 1) with the host apparatus 200. The MPU 6 controls the HDC 4 and HIC 5 according to a micro program (software) stored in the ROM 7, and performs command processing in which commands transmitted from the host apparatus 200 are handled. The micro program is stored in the ROM 7. In addition, in some cases, part of the micro program may be recorded in a special field secured beforehand on a disk surface. In this case, the part of the micro program recorded in the special field is read into the RAM 8 when the disk apparatus 100 is activated. A command queue (storage area) for holding a plurality of commands is provided in the RAM 8, and a command transmitted from the host apparatus 200 is queued into this command queue. In addition, the RAM 8 temporarily holds (caches) the read address, write address, and write data that are received from the host apparatus 200, the read data read from the disk 1, and the like.

A set of counters and/or logs (i.e., counters/logs) are used to register the pattern of usage of the disk apparatus 100, and can be used to set warranty rules in much the same way that an odometer is used to set warranty rules for the automotive industry. These counters/logs record various status parameters or factors that influence the longevity of the disk apparatus 100. These include operating parameters relating to operating usage and environment, as well as non-operating parameters relating to the environment (e.g., temperature and shock) during which the disk apparatus 100 is off. The status parameters include, for example, usage information such as power on hours (e.g., 24×7 or 12×5), number of seek operations, number of writes, number of reads, duty cycle, number of hours above a certain duty cycle, number of disk revolutions, and the like; and environmental data such as operating temperature (maximum, minimum, average, standard), non-operating temperature (maximum, minimum, average, standard), operating shock (maximum, minimum, average, standard), non-operating shock (maximum, minimum, average, standard), and the like. The usage data may be used to derive information relating to the usage pattern, such as balanced or unbalanced read/write operations (e.g., read only), whether access is dominated by contiguous access or random access, and the like. For a given disk apparatus design, there can be substantial variability in longevity depending on the operating environment and usage pattern as well as the non-operating environment. For example, a desktop HDD in a storage array used 12×5 with peak period of high duty cycle (over 80%) consisting of random R/W commands occurring twice a day for 3 hours each will be quite vulnerable to failure, while the same desktop HDD in a personal video recorder (PVR) used 24×7 with a 100% duty cycle (always recording) consisting of mostly sequential access will probably be much less vulnerable to failure.

The set of counters/logs are preferably tamper resistant, non-resettable, and always on, so that the user does not have the option to turn them off or reset them. The counters/logs are preferably stored in a nonvolatile storage or memory in the disk apparatus 100. In one example, the nonvolatile storage is a reserved area on the surface of the disk 1. During power up, the disk apparatus 100 reads the current settings to memory and keeps incrementing them as the disk apparatus 100 is used. Periodically (e.g., every 10 minutes), or as part of a power-down routine, the permanent counters/logs are updated. The amount of memory required is quite small (e.g., about 1-2 kB or less).

In another example, the disk apparatus 100 includes a tamper-resistant, nonvolatile memory 20 such as a solid-state memory for storing the counters/logs. The memory 20 may be a solid state TRM (Tamper Resistant Module) on the PCB. The use of a nonvolatile memory 20 other than the disk 1 has the benefit that the stored information can be configured to be accessible even if the disk apparatus 100 is no longer operational. If the nonvolatile memory 20 is a physical device, it is desirably located at or near the outside of the disk apparatus 100 so that it can be readily seen. There is no need to power up the disk apparatus or connect electronics to the disk apparatus 100. If the nonvolatile memory 20 is an electronic device such as a flash memory, the information stored therein is preferably accessible without powering up the disk apparatus 100. For instance, a simple interface can be implemented for connecting an external probe 22 to read (but not write or reset) the information stored in the nonvolatile memory 20. There is no need to power up the disk apparatus.

The updating of counters/logs, either periodically or during power-up and shut-down, provides a scheduler for the retrieval of data and statistics for various purposes. For example, this can be used to obtain warranty factor statistics, to save statistics that were saved to the disk during the use of the disk apparatus to the nonvolatile memory, and to send warranty information and status via a network (e.g., the Internet) to the manufacturer's customer database.

The counters/logs can also be used for security purposes, in much the same way as odometers in automobiles. A system can check the usage counter right before shut-down and right after power-up, compare the two reading and verify if the disk apparatus 100 has been used elsewhere during the time the system was down. Encrypted usage parameters can be used to keep track of the location of the disk apparatus 100. This information can be part of the status parameters stored in the counters/logs.

Another desirable feature is a mechanism for verifying the warranty status when the disk apparatus 100 has failed. This may be the most common usage scenario. Because there are no guarantees that the electronics will still be operational on the disk apparatus 100, it is important to provide a way to ascertain whether the disk apparatus 100 is still under warranty by obtaining the usage information or warranty factor statistics stored in the disk apparatus even if the electronics is not working. This can be achieved by providing a warranty flag that is turned on when the warranty has expired. The disk apparatus 100 will be given certain warranty threshold(s). When the disk apparatus status as represented by the status parameters or factors, such as usage or temperature, exceeds the warranty threshold(s), the warranty expiration flag is set. The verification of the counters/logs against the warranty threshold(s) can be conducted periodically (e.g., every few minutes) as well. The warranty status can also be stored in the logs/counters as a status parameter in the disk apparatus to indicate whether the warranty has terminated or not.

One way of verifying the warranty status is to use a warranty status indicator such as a fuse 30 that is burned by the disk apparatus 100 when the status of the disk apparatus 100 exceeds a warranty threshold. As seen in FIG. 1, a fuse burning unit 32 (which receives power from a power source) can be activated by the HDC 4 to burn the fuse 30 to indicate that the warranty has expired or been voided. For instance, the warranty may expire after reaching a certain usage level in terms of hours of operation or the like, and may be voided due to excessive temperature, excessive shock (e.g., customer drops a laptop), or the like. An alternative to burning a fuse is to cause a warranty status indicator to change color in an irreversible manner, so that the color indicator device cannot be restored to its original color state. The warranty status indicator should be constructed such that it is extremely unlikely to expire prematurely under normal operation within the warranty specification (such as burning of a fuse or changing of color in a color indicator device). When a defective disk apparatus is presented for warranty repair or replacement, it is possible to check the fuse 30 or some other warranty status indicator to ascertain quickly and easily whether the warranty has expired without the need to power up the disk apparatus.

The warranty status indicator 30 provides an irreversible indication when the warranty of the disk apparatus 100 is terminated. To detect such an event, a detection module is provided to measure the temperature, shock, or the like. The detection module can include various sensors and transducers. Any suitable sensors and transducers may be used including, for instance, those disclosed in http://www.chatsworth-data.com/iog/indicators.htm, http://www.coldice.com/coldmark_temperature_indicators.html, or the like. Another example of a detection module is the nonvolatile storage 20 and the disk controller 4 that stores the log of status parameters of the disk apparatus 100 in the nonvolatile storage 20. The warranty can expire or be voided based on the status parameters relating to usage, including operating and non-operating parameters as described above.

Figure 2:
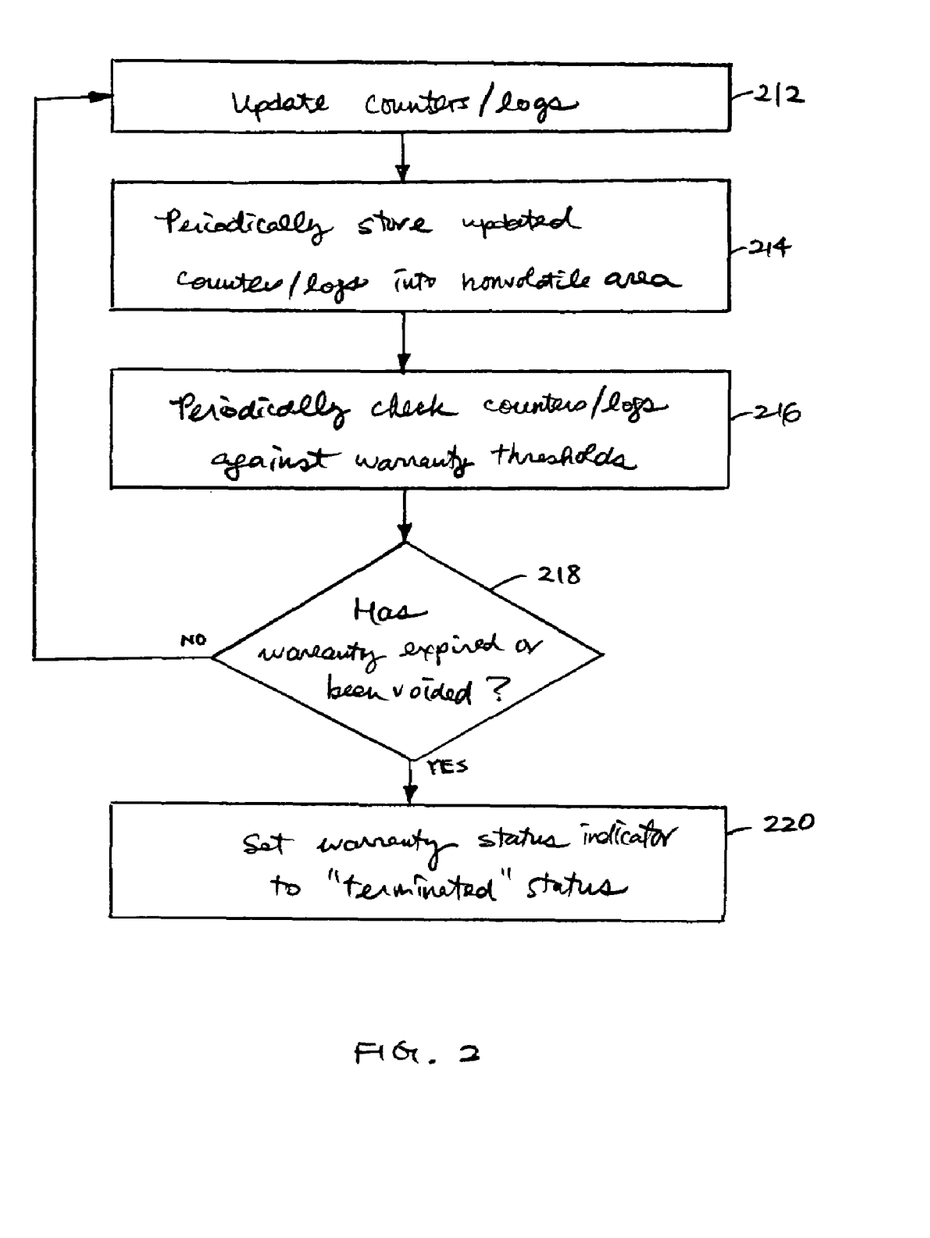
FIG. 2 is flow diagram illustrating the use of the counters/logs for warranty validation according to another embodiment of the present invention.

FIG. 2 is a flow diagram that illustrates the use of the counters/logs for warranty validation according to one embodiment of the invention. By verifying the state of the counters/logs, one can easily and quickly ascertain whether the disk apparatus is still under warranty. The logging of various status parameters for use as warranty factor statistics can be performed periodically by writing to a reserved area of the disk apparatus such as a nonvolatile memory. More specifically, when the disk apparatus 100 is turned on, it loads the counters/logs and continues updating them (step 212). The disk controller 4 periodically writes the counters/logs to the reserved, nonvolatile area 20 (step 214). Periodically the disk controller 4 checks the counters/logs against a set of warranty thresholds (step 216) to determine whether the warranty has expired or has been voided (step 218). Once the warranty has expired or been voided, the warranty status indicator (e.g., the fuse 30) is set to the "terminated" status (step 220). Otherwise, the disk apparatus 100 continues to update and monitor the counters/logs.

The warranty status indicator may also be set to the "terminated" status when a certain status parameter that is not included in the counters/logs exceeds the permissible warranty threshold. For example, the warranty may be voided when the temperature exceeds a threshold temperature level or the shock exceeds a threshold shock level. In that case, the warranty status indicator will be set to the "terminated" status. The blowing of the fuse 30 is one example. In another example, a temperature-sensitive device contains one or more fluids that change in volume with a change in temperature. The one or more fluids leave a permanent color mark in the temperature-sensitive device that indicates the maximum temperature and/or minimum temperature detected for the disk apparatus. A visual inspection of the temperature-sensitive device will indicate whether the warranty has been set to the "terminated" status because the temperature fell outside the acceptable range.

The new architecture allows for a set of flexible warranty policies that take into account usage patterns in addition to time. Advantageously, one can design HDDs for specific applications without the concern for increased warranty costs if it is used in different environments from what is intended. For instance, the manufacturer can set usage warranty thresholds for desktop model HDDs that will prevent them from being used in enterprise applications such as storage arrays without voiding the warranty. In this way, the manufacturer can use a differentiator in terms of warranty for PC OEMs or the like as opposed to HDDs designed for more rigorous usage, and avoid problems associated with ill use of low cost HDDs in storage subsystems or other enterprise applications. More generally, the architecture allows the manufacturer to better match warranty costs and policies with parameters that affect the longevity of the HDD products. This is important with the advent of SATA interfaces and the use of desktop HDDs in low-cost enterprise storage solutions, and the use of HDDs in consumer electronics with its own set of requirements and potentially custom-designed HDDs also with ATA/SATA interface.

The availability of counters/logs that can be read without powering up the disk apparatus is of great value to the warranty and repair service that processes millions of products a year. It enables the use of a quick test to determine the appropriate corrective action without having to power up the disk apparatus.

Another use of the counters/logs is for feedback. Failures can be correlated with usage patterns and environmental conditions to determine what the main causes of short life are for the disk apparatus. The data recovered from failed disk apparatus (as well as others in working conditions that are recovered) can provide a better understanding as to what influences longevity in the disk apparatus. This information can be fed back into development to produce more reliable and longer life products. The information can further identify certain specifications that can be relaxed for particular applications. To do so, the designer will design the disk apparatus for specific applications or usage models, and have a way of verifying that the required environmental conditions and usage patterns are satisfied, so as to control the warranty costs.

In general, the usage information can be used to set the cost of the disk apparatus and/or the cost of the warranty. For example, a system can be leased and the customer can be charged according to disk apparatus utilization. For this application, it is particularly desirable to have the counters/logs in a solid state TRM on the PCB. Moreover, the warranty length can be set based on the usage of the disk apparatus or of the system that incorporates the disk apparatus. The warranty factor statistics that affects the longevity of the disk apparatus (as associated with the log of various status parameters) and customer return data of the disk apparatus are determinative factors that can be evaluated to determine the proper pricing of the disk apparatus and/or the warranty of the disk apparatus, and/or the duration and term of the warranty for a given type of use.

Figure 3:
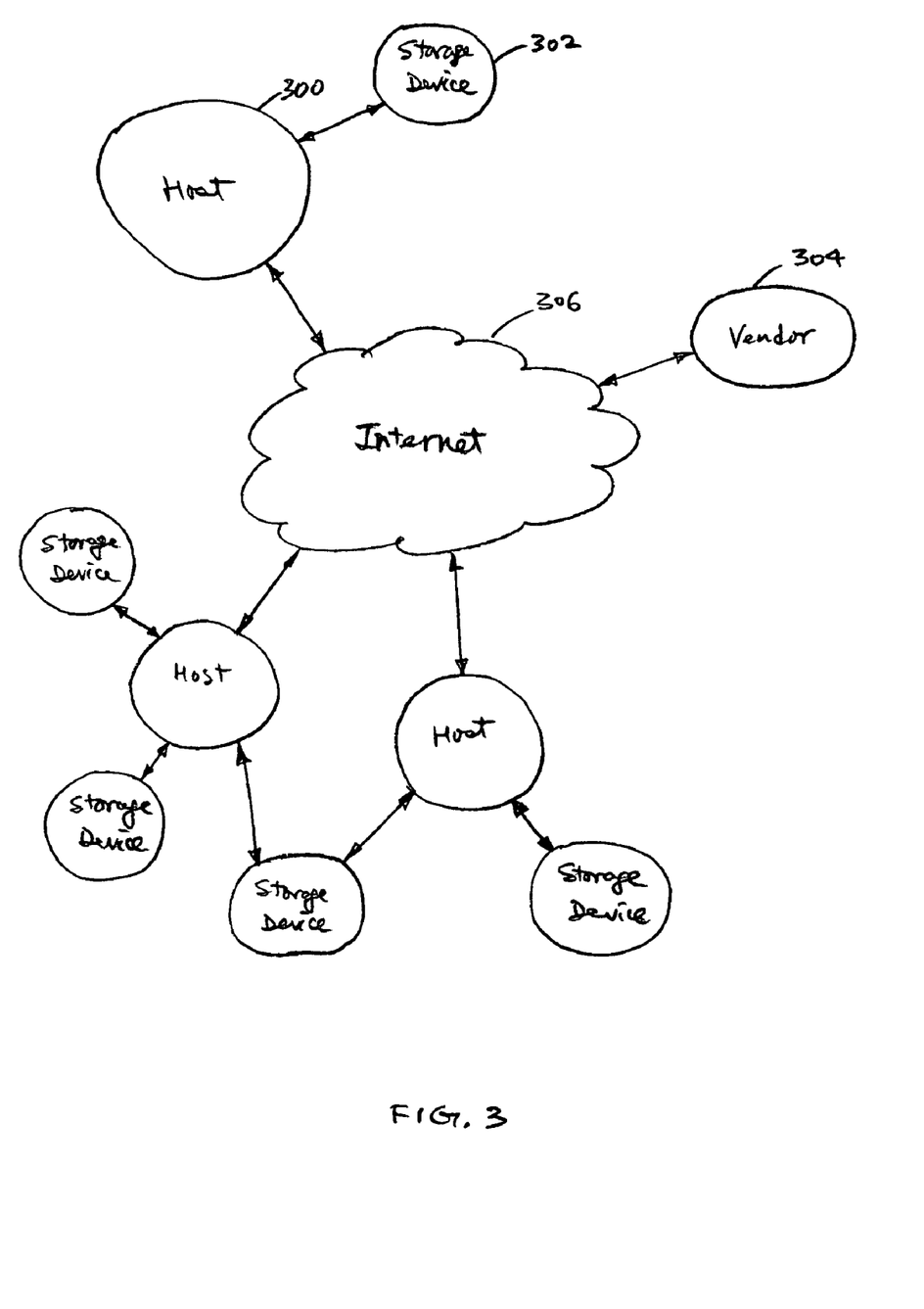
FIG. 3 is a schematic diagram depicting a system for processing status parameters of one or more data storage apparatuses according to another embodiment of the present invention.

As shown in FIG. 3, a host system or server 300 makes use of the storage device 302, and communicates with the vendor 304 via a network such as the Internet 306. The host 300 can retrieve the status parameters from the storage device 302, and transfers it via the network 306 to the sales/service department of the vendor 304. The status parameters typically contains usage information such as usage pattern and condition, and can in turn be used to generate warranty information such as warranty factor statistics, warranty length, warranty expiration, and the like; pricing information such as pricing of the storage device, warranty pricing, lease pricing, and the like; and design improvement information for the storage device such as main factors affecting the longevity of the storage device and product specifications that can be relaxed as having little or no influence on the longevity of the storage device for the particular usage. This can be done while the host 300 is in use. The software for retrieving and transferring the status parameters can be installed in the host 300 when the storage device 302 is installed. Alternatively, the host 300 may accept the software from the vendor 304 via the network 302, which can be updated or upgraded. For example, the vendor 304 may periodically send requests for information to the host 300 which, when access is authorized, collect the information requested and send it to the vendor 304. The request includes computer-readable instructions on retrieving and sending the status parameters to the vendor 304. When warranty repair is performed, the data from the warranty register of the storage device 302 can be retrieved and sent to the vendor 304. This information can be included as part of the status parameters.

The host 300 may also receive alerts from the vendor 304 regarding warranty violations or impending expiration of warranty. For example, the vendor 304 can send the host 300 the alert if excessive shock or temperature is detected, or if any status parameter exceeds the range permissible under the warranty. The vendor 304 may also provide the host 300 with information on the number of remaining days of the warranty under the current terms. This may be done after the number of remaining days falls below a threshold (e.g., 30 days).

For a given customer, the vendor 304 can retrieve from the storage device 302 the status parameters that can be used to generate warranty information for use in determining current and/or future warranty price and duration. For example, the vendor 304 may monitor a random sample of the storage devices instead of all the storage devices. The information can be gathered through one or more host systems.

Figure 4:
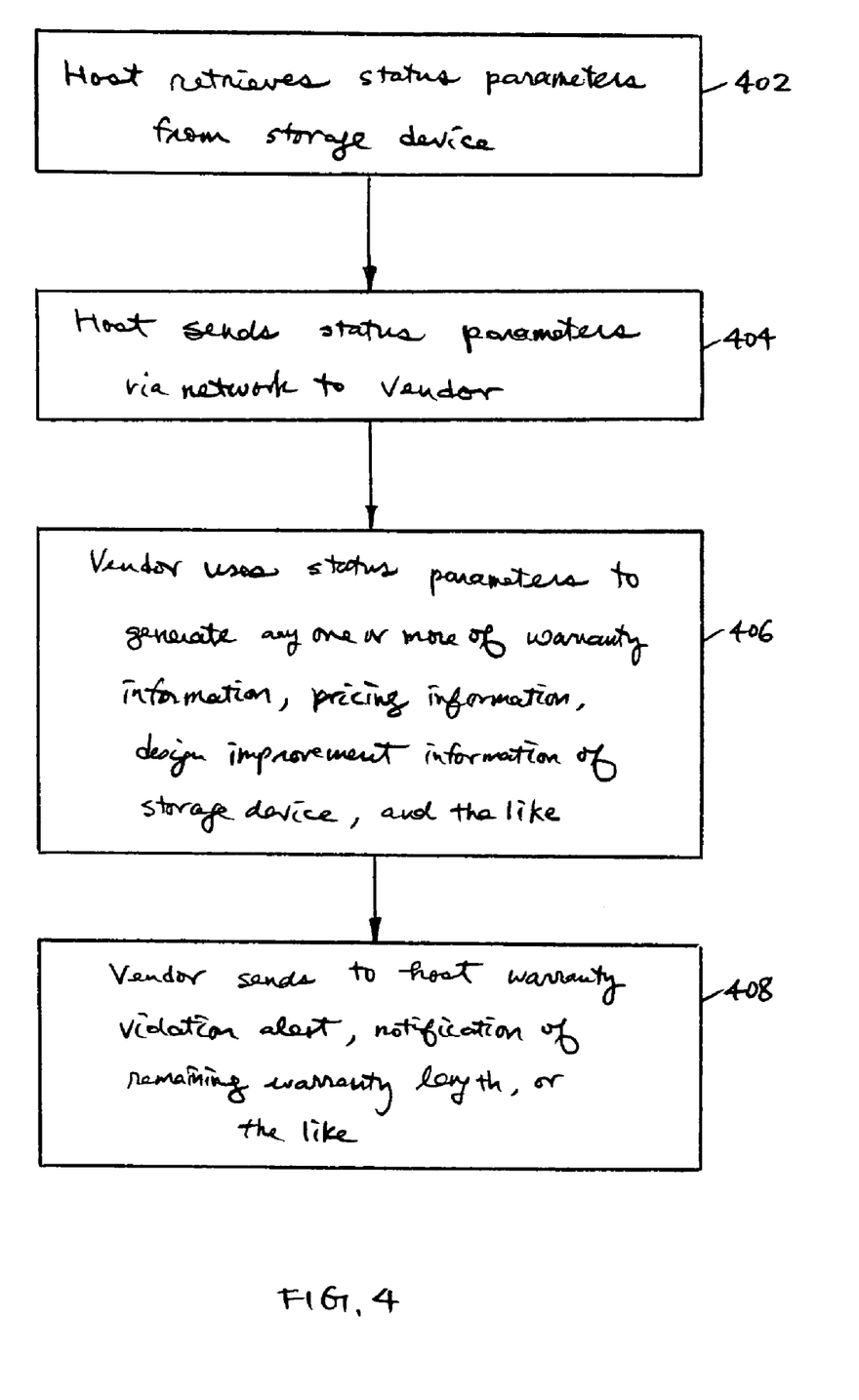
FIG. 4 is a flow diagram illustrating the transfer of information between the host and the vendor for processing status parameters of one or more data storage devices according to another embodiment of the present invention.

FIG. 4 shows a flow diagram illustrating the transfer of information between the host 300 and the vendor 304 for processing status parameters of one or more data storage devices according to one embodiment of the invention. In step 402, the host 300 retrieves the status parameters from the storage device 302. In the embodiments discussed above, the status parameters are stored as logs/counters in a nonvolatile storage such as the surface of a disk or a separate memory 20. In general, the status parameters may be stored in any suitable form in any suitable medium for implementing the methodology of information transfer between the host and the vendor in this embodiment.

In step 404, the host 300 transfers the status parameters via the network 306 to the vendor 304. The retrieving and transfer of the status parameters may occur automatically on a periodic basis. Alternatively, the host 300 retrieves and transfers the status parameters in response to a request received from the vendor 304 via the network 306. The information to be transferred can be standardized, or the vendor 304 may request specific data from the host 300.

In step 406, the status parameters can be used by the vendor 304 to perform any of a number of tasks. For example, the tasks may include determining the pricing of the storage device, calculating the pricing of the warranty for the storage device, determining the warranty length, setting the lease price of the storage device based on usage pattern (e.g., duty cycle, number of reads, and number of writes) and/or usage condition (e.g., temperature and shock) or the like, providing data to be used to improve the design of the storage device, and the like. Post-processing of the status parameters typically occurs on the vendor side, although it is possible to have the host side perform some post-processing prior to transferring the information to the vendor.

In some cases, the vendor 304 will transfer information back to the host 300 based on the status parameters received (step 408). For instance, the vendor 304 may alert the customer on the host side of a warranty violation based on excessive temperature, shock, usage, or the like. The vendor 304 may also notify the customer on the host side of impending expiration of the warranty or lease based on the status parameters, and allow the customer to renew the warranty or lease. The above information transfer process may be encoded in computer software and executed in computer devices on the host side and the vendor side.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of processing status parameters of one or more data storage apparatuses, the method comprising:
    sending a request by a vendor system to a host system for retrieval of one or more status parameters prior to retrieving and sending the one or more status parameters to the vendor system by the host system;
    receiving, via a network by the vendor system, one or more status parameters of the data storage apparatus retrieved by the host system from the data storage apparatus; and
    using the one or more status parameters to generate any one or more of warranty information, pricing information, and design improvement information for the data storage apparatus,
    wherein the status parameters correspond to current usage statistics with respect to an operating time period, a current temperature, and a shock exposure of the data storage apparatus;
    wherein the status parameters corresponding to the current usage statistics, the temperature, and the shock exposure of the data storage device are sent automatically by the host system to the vendor system on a periodic basis.

2. The method of claim 1 wherein the one or more status parameters are stored in a nonvolatile storage in the data storage apparatus.

3. The method of claim 1 wherein the one or more status parameters are retrieved automatically by the host system on a periodic basis.

4. The method of claim 1 wherein the request from the vendor system includes computer-readable instructions on retrieving and sending the one or more status parameters.

5. The method of claim 1 wherein the warranty information generated includes any one or more of warranty length, warranty termination, and warranty factor statistics for the data storage apparatus.

6. The method of claim 1 wherein the pricing information generated includes any one or more of pricing of the data storage apparatus, warranty pricing of the data storage apparatus, and lease pricing of the data storage apparatus.

7. The method of claim 1 wherein the design improvement information generated includes any one or more of a main factor affecting longevity of the data storage apparatus, and product specification that can be relaxed as having little or no influence on the longevity of the data storage apparatus.

8. The method of claim 1 wherein receiving comprises receiving one or more status parameters of a random sample of multiple data storage apparatuses by the vendor system.

9. The method of claim 1 further comprising sending by the vendor system to the host system via the network an alert regarding warranty violation if the one or more status parameters fall outside an acceptable range.

10. The method of claim 1 further comprising sending by the vendor system to the host system via the network a notification regarding remaining warranty length of the data storage apparatus based on the one or more status parameters.

11. A system for processing status parameters of one or more data storage apparatuses, the system comprising:
at least one host system configured to retrieve one or more status parameters of one or more data storage apparatus;
a vendor system; and
a network coupled with the at least one host system and the vendor system;
wherein the at least one host system is configured to send the one or more status parameters via the network to the vendor system; and
wherein the vendor system is configured to send a request to the at least one host system, the request including computer-readable instructions on retrieving and sending the one or more status parameters to the vendor system; and configured to use the one or more status parameters to generate any one or more of warranty information, pricing information, and design improvement information for the data storage apparatus,
wherein the status parameters correspond to current usage statistics with respect to an operating time period, a current temperature, and a shock exposure of the data storage apparatus;
wherein the status parameters corresponding to the current usage statistics, the current temperature, and the shock exposure of the data storage device are sent automatically by the host system to the vendor system on a periodic basis.

12. The system of claim 11,
wherein the warranty information generated includes any one or more of warranty length, warranty termination, and warranty factor statistics for the data storage apparatus;
wherein the pricing information generated includes any one or more of pricing of the data storage apparatus, warranty pricing of the data storage apparatus, and lease pricing of the data storage apparatus; and
wherein the design improvement information generated includes any one or more of a main factor affecting longevity of the data storage apparatus, and product specification that can be relaxed as having little or no influence on the longevity of the data storage apparatus.

13. The system of claim 11 wherein the vendor system is configured to send an alert via the network to the at least one host system regarding warranty violation if the one or more status parameters fall outside an acceptable range.

14. The system of claim 11 wherein the vendor system is configured to send a notification via the network to the at least one host system regarding remaining warranty length of the one or more data storage apparatus based on the one or more status parameters.

15. A computer program product stored on a computer-readable storage medium for processing status parameters of one or more data storage apparatuses, the computer program product comprising:
instructions for receiving, via a network by a vendor system, one or more status parameters of a data storage apparatus retrieved by a host system from the data storage apparatus; and
instructions for using the one or more status parameters to generate any one or more of warranty information, pricing information, and design improvement information for the data storage apparatus,
wherein the status parameters correspond to current usage statistics with respect to an operating time period, a current temperature, and a shock exposure of the data storage apparatus;
wherein the status parameters corresponding to the current usage statistics, the current temperature, and the shock exposure of the data storage device are sent automatically by the host system to the vendor system on a periodic basis.

16. The computer program product of claim 15 further comprising instructions for sending a request by the vendor system to the host system for retrieval of the one or more status parameters prior to retrieving and sending the one or more status parameters to the vendor system by the host system.

17. The computer program product of claim 16 wherein the request from the vendor system includes computer-readable instructions on retrieving and sending the one or more status parameters.

18. The computer program product of claim 15,
wherein the warranty information generated includes any one or more of warranty length, warranty termination, and warranty factor statistics for the data storage apparatus;
wherein the pricing information generated includes any one or more of pricing of the data storage apparatus, warranty pricing of the data storage apparatus, and lease pricing of the data storage apparatus; and
wherein the design improvement information generated includes any one or more of a main factor affecting longevity of the data storage apparatus, and product specification that can be relaxed as having little or no influence on the longevity of the data storage apparatus.

19. The computer program product of claim 15 wherein the instructions for receiving comprises code for receiving one or more status parameters of a random sample of multiple data storage apparatuses by the vendor system.

20. The computer program product of claim 15 further comprising instructions for sending by the vendor system to the host system via the network an alert regarding warranty violation if the one or more status parameters fall outside an acceptable range.

21. The computer program product of claim 15 further comprising instructions for sending by the vendor system to the host system via the network a notification regarding remaining warranty length of the data storage apparatus based on the one or more status parameters.

* * * * *

UNITED STATES PATENT AND TRADEMARK OFFICE
CERTIFICATE OF CORRECTION

PATENT NO. : 7,606,948 B2
APPLICATION NO. : 11/004527
DATED : October 20, 2009
INVENTOR(S) : Campello et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Twelfth Day of October, 2010

David J. Kappos
*Director of the United States Patent and Trademark Office*